(12) United States Patent
Lin

(10) Patent No.: US 11,201,554 B2
(45) Date of Patent: Dec. 14, 2021

(54) FLYBACK POWER CONVERTER AND ZVS CONTROL CIRCUIT AND CONTROL METHOD THEREOF

(71) Applicant: RICHTEK TECHNOLOGY CORPORATION, Zhubei (TW)

(72) Inventor: Tzu-Chen Lin, ChangHua (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 84 days.

(21) Appl. No.: 16/701,124

(22) Filed: Dec. 2, 2019

(65) Prior Publication Data

US 2020/0280263 A1     Sep. 3, 2020

(30) Foreign Application Priority Data

Feb. 28, 2019 (CN) .......................... 201910149603.0
Jun. 14, 2019 (CN) .......................... 201910514529.8

(51) Int. Cl.
*H02M 3/335* (2006.01)
*H02M 1/08* (2006.01)

(52) U.S. Cl.
CPC ....... *H02M 3/33592* (2013.01); *H02M 1/083* (2013.01)

(58) Field of Classification Search
CPC ..... H02M 3/33592; H02M 2001/0058; H02M 1/083
See application file for complete search history.

(56) References Cited

U.S. PATENT DOCUMENTS

| 6,069,803 | A  | * | 5/2000  | Cross   | H02M 3/33569 363/21.14 |
| 6,249,444 | B1 | * | 6/2001  | Cross   | H02M 3/33569 363/21.03 |
| 9,614,449 | B2 | * | 4/2017  | Chang   | H02M 3/33523 |
| 9,755,529 | B2 | * | 9/2017  | Chen    | H02M 1/08 |
| 10,003,248 | B1 | * | 6/2018  | Malinin | H02M 1/083 |
| 10,014,786 | B2 | * | 7/2018  | Yang    | H02M 3/33592 |
| 10,103,616 | B1 | * | 10/2018 | Lin     | H02M 1/083 |
| 10,177,670 | B1 | * | 1/2019  | Lin     | H02M 1/083 |
| 10,181,782 | B2 | * | 1/2019  | Lin     | H02M 1/088 |
| 10,516,340 | B1 | * | 12/2019 | Malinin | H02M 1/083 |
| 10,560,012 | B1 | * | 2/2020  | Yang    | H02M 1/083 |
| 2014/0003096 | A1 | * | 1/2014  | Deng    | H02M 3/33592 363/21.14 |

(Continued)

Primary Examiner — Sisay G Tiku
(74) Attorney, Agent, or Firm — Tung & Associates (57) ABSTRACT

A ZVS (zero voltage switching) control circuit for controlling a flyback power converter includes: a primary side controller circuit, for generating a switching signal to control a primary side switch; and a secondary side controller circuit, for generating a synchronous rectifier (SR) control signal to control a synchronous rectifier switch. The SR control signal includes an SR-control pulse and a ZVS pulse. The primary side controller circuit determines a trigger timing point of the switching signal according to a first waveform characteristic of a ringing signal, to control the primary side switch to be ON. The secondary side controller circuit determines a trigger timing point of the ZVS pulse according to a second waveform characteristic of the ringing signal, to control the synchronous rectifier switch to be ON for a predetermined ZVS time period, thereby achieving zero voltage switching of the primary side switch.

26 Claims, 8 Drawing Sheets

(56) References Cited

U.S. PATENT DOCUMENTS

| | | | |
|---|---|---|---|
| 2018/0351463 A1* | 12/2018 | Werner | H02M 3/33561 |
| 2018/0358902 A1* | 12/2018 | Duvnjak | H02M 3/33592 |
| 2019/0149032 A1* | 5/2019 | Yang | H02M 1/083 |
| | | | 363/21.14 |
| 2020/0153327 A1* | 5/2020 | Lin | H02M 3/33592 |

* cited by examiner

FLYBACK POWER CONVERTER AND ZVS CONTROL CIRCUIT AND CONTROL METHOD THEREOF

CROSS REFERENCE

The present invention claims priority to CN 201910149603.0, filed on Feb. 28, 2019, and to CN 201910514529.8, filed on Jun. 14, 2019.

BACKGROUND OF THE INVENTION

Field of Invention

The present invention relates to a flyback power converter; particularly, it relates to such flyback power converter capable of achieving zero voltage switching (ZVS). The present invention also relates to a ZVS control circuit for use in such flyback power converter and a control method of such flyback power converter.

Description of Related Art

Figure 1:
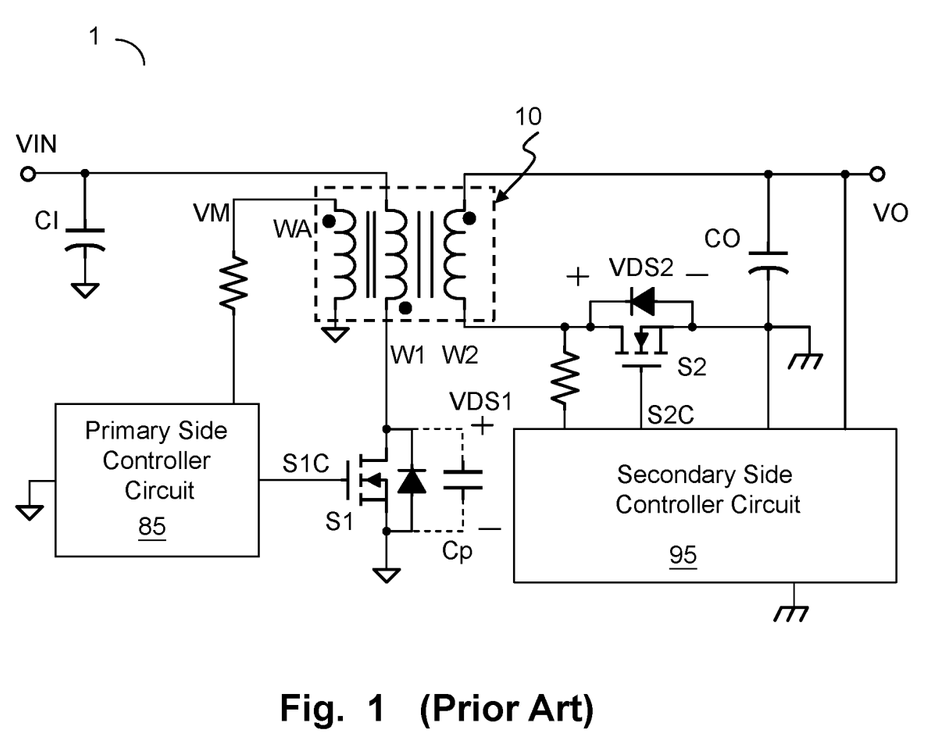
FIG. 1 shows a schematic diagram of a prior art flyback power converter.

FIG. 1 shows a prior art flyback power converter (flyback power converter 1), wherein a primary side controller circuit 85 controls a primary side switch S1 to operate the power transformer 10 so as to generate an output voltage VO. A secondary side controller circuit 95 generates a synchronous rectifier (SR) control signal S2C to control a synchronous rectifier switch S2 for performing synchronous rectification at the secondary side. The term "synchronous rectification" as described herein means that the synchronous rectifier switch S2 switches in substantially opposite phase to the primary side switch S1.

The prior art in FIG. 1 has a drawback that the synchronous rectifier switch S2 at the secondary side cannot be precisely synchronized with the primary side switch S1 at the primary side. Besides, the power conversion efficiency is low since the primary side switch S1 does not operate by zero voltage switching. The term "zero voltage switching" as described herein means that the primary side switch S1 is turned ON at a timing point when the voltage difference across its drain and source is substantially zero.

As compared to the prior art in FIG. 1, the present invention is advantageous in that: through a ringing signal, the synchronous rectifier switch S2 can be precisely synchronized with the primary side switch S1. Besides, the power conversion efficiency is improved since the primary side switch S1 operates by zero voltage switching.

SUMMARY OF THE INVENTION

From one perspective, the present invention provides a zero voltage switching (ZVS) control circuit for use in a flyback power converter, the flyback power converter being configured to operably convert an input voltage to an output voltage, the ZVS control circuit comprising: a primary side controller circuit, which is configured to operably generate a switching signal to control a primary side switch, thereby controlling a power transformer to convert the input voltage to the output voltage; and a second controller circuit, which is configured to operably generate a ZVS pulse to control a winding of the power transformer; wherein the primary side controller circuit determines a trigger timing point of the switching signal according to a first waveform characteristic of a ringing signal, so as to control the primary side switch to be ON, and wherein the second controller circuit determines a trigger timing point of the ZVS pulse according to a second waveform characteristic of the ringing signal, so as to control the winding of the power transformer to be ON for a predetermined ZVS time period, thereby achieving zero voltage switching of the primary side switch; wherein the ringing signal is related to a ringing current of the power transformer.

In one embodiment, the second controller circuit includes a secondary side controller circuit, and the winding of the power transformer is a secondary side winding of the power transformer; the secondary side controller circuit is configured to operably generate a synchronous rectifier (SR) control signal for controlling a synchronous rectifier switch, thereby controlling the secondary side winding of the power transformer to generate the output voltage, wherein the SR control signal includes an SR-control pulse and the ZVS pulse, wherein the SR-control pulse is configured to operably control the synchronous rectifier switch to be ON for an SR time period to perform secondary side synchronous rectification, and wherein the ZVS pulse is configured to operably control the synchronous rectifier switch to be ON for the predetermined ZVS time period, to achieve zero voltage switching of the primary side switch.

In one embodiment, the second controller circuit determines the trigger timing point of the ZVS pulse according to the second waveform characteristic, so as to control the winding of the power transformer to be ON for the predetermined ZVS time period before the primary side switch is turned ON, so that under a steady state, the trigger timing point of the ZVS pulse is earlier than the trigger timing point of the switching signal by a predetermined time difference, thereby achieving zero voltage switching of the primary side switch; wherein the predetermined time difference is related to a ringing period of the ringing signal.

In one embodiment, the flyback power converter operates under a discontinuous conduction mode (DCM).

In one embodiment, the first waveform characteristic includes a peak, a valley, a rising edge or a falling edge of the ringing signal, and the second waveform characteristic includes a peak, a valley, a rising edge or a falling edge of the ringing signal.

In one embodiment, the switching signal is configured to operably control the primary side switch according to a switching period, wherein during a present switching period, the trigger timing point of the ZVS pulse is a timing point of a predetermined number of occurrences of the second waveform characteristics of the ringing signal, wherein the predetermined number is related to a number of occurrences of the first waveform characteristics or a number of occurrences of the second waveform characteristic of a previous switching period.

In one embodiment, during the present switching period, when the trigger timing point of the ZVS pulse is later than the trigger timing point of the switching signal, the ZVS pulse is not triggered.

In one embodiment, the ringing signal includes a primary side voltage, wherein the primary side voltage is a voltage drop between a current in-flow terminal and a current out-flow terminal of the primary side switch.

In one embodiment, the trigger timing point of the switching signal is synchronous with a valley or a falling edge of the primary side voltage; during a present switching period, the trigger timing point of the ZVS pulse is a timing point of a predetermined number of occurrences of peaks or rising edges of the primary side voltage, wherein the predetermined number is a total number of the valleys or the falling edges of the primary side voltage during a previous switching period minus one.

In one embodiment, the ringing signal includes a primary side voltage and a secondary side voltage, wherein the primary side voltage is a voltage drop between a current in-flow terminal and a current out-flow terminal of the primary side switch, and the secondary side voltage is a voltage drop between a current in-flow terminal and a current out-flow terminal of the synchronous rectifier switch; the trigger timing point of the switching signal is synchronous with a valley or a falling edge of the primary side voltage; during a present switching period, the trigger timing point of the ZVS pulse is a timing point of a predetermined number of occurrences of valleys or falling edges of the secondary side voltage, wherein the predetermined number is a total number of the valleys or the falling edges of the secondary side voltage during a previous switching period.

In one embodiment, the primary side voltage is obtained through another winding of the power transformer which is not a primary side winding of the power transformer.

In one embodiment, each peak or each rising edge of the ringing signal is determined through detecting whether the ringing signal rises up to a first voltage threshold; and/or each valley or each falling edge of the ringing signal is determined through detecting whether the ringing signal drops to a second voltage threshold.

In one embodiment, the trigger timing point of the switching signal is determined through detecting whether the ringing signal drops to a third voltage threshold, wherein the third voltage threshold is lower than the second voltage threshold.

In one embodiment, the ringing signal includes a primary side voltage and a secondary side voltage, wherein the primary side voltage is a voltage drop between a current in-flow terminal and a current out-flow terminal of the primary side switch, and the secondary side voltage is a voltage drop between a current in-flow terminal and a current out-flow terminal of the synchronous rectifier switch, and the ZVS control circuit is characterized by at least one of the following: (1) when the ringing signal is the primary side voltage, the first voltage threshold corresponding to the primary side voltage is related to the input voltage; (2) when the ringing signal is the primary side voltage, the first voltage threshold corresponding to the secondary side voltage is related to the input voltage; and/or (3) when the ringing signal is the secondary side voltage, the second voltage threshold corresponding to the secondary side voltage is related to the output voltage.

In one embodiment, the ZVS control circuit is characterized by at least one of the following: (1) when the ringing signal is the primary side voltage, the first voltage threshold corresponding to the primary side voltage is higher than or equal to the input voltage; (2) when the ringing signal is the primary side voltage, the first voltage threshold corresponding to the secondary side voltage is lower than or equal to the input voltage; and/or (3) when the ringing signal is the secondary side voltage, the second voltage threshold corresponding to the secondary side voltage is a divided voltage of the output voltage.

In one embodiment, the switching signal is triggered after a predetermined delay period from when the valley or the falling edge of the primary side voltage occurs.

In one embodiment, the second controller circuit includes a primary side upper gate controller circuit, and the winding of the power transformer is a primary side winding of the power transformer, wherein the primary side upper gate controller circuit is configured to operably generate the ZVS pulse for controlling an upper gate switch, the ZVS pulse being configured to operably control the upper gate switch to be ON for the predetermined ZVS time period, thereby achieving zero voltage switching of the primary side switch; wherein the upper gate switch and an upper gate capacitor are connected in series to form an upper gate branch circuit, the upper gate branch circuit being connected in parallel to the primary side winding.

In one embodiment, the ringing signal includes a primary side voltage and an upper gate voltage, wherein the primary side voltage is a voltage drop between a current in-flow terminal and a current out-flow terminal of the primary side switch, and the upper gate voltage is a voltage drop between a current in-flow terminal and a current out-flow terminal of the upper gate switch; wherein the trigger timing point of the switching signal is synchronous with a valley or a falling edge of the primary side voltage, and wherein during a present switching period, the trigger timing point of the ZVS pulse is a timing point of a predetermined number of occurrences of valleys or falling edges of the upper gate voltage, wherein the predetermined number is a total number of the valleys or the falling edges of the upper gate voltage during a previous switching period.

From another perspective, the present invention provides a flyback power converter, which is configured to operably convert an input voltage to an output voltage, the flyback power converter comprising: a power transformer coupled between the input voltage and the output voltage; a primary side switch coupled to a primary side of the power transformer; and a zero voltage switching (ZVS) control circuit including: a primary side controller circuit, which is configured to operably generate a switching signal to control a primary side switch, thereby controlling a power transformer to convert the input voltage to the output voltage; and a second controller circuit, which is configured to operably generate a ZVS pulse to control a winding of the power transformer; wherein the primary side controller circuit determines a trigger timing point of the switching signal according to a first waveform characteristic of a ringing signal, so as to control the primary side switch to be ON, and wherein the second controller circuit determines a trigger timing point of the ZVS pulse according to a second waveform characteristic of the ringing signal, so as to control the winding of the power transformer to be ON for a predetermined ZVS time period, thereby achieving zero voltage switching of the primary side switch; wherein the ringing signal is related to a ringing current of the power transformer.

From yet another perspective, the present invention provides a control method of a flyback power converter, the control method being configured to operably control the flyback power converter to convert an input voltage to an output voltage, the control method comprising: generating a switching signal to control a primary side switch, thereby controlling a power transformer; and generating a ZVS pulse to control a winding of the power transformer; wherein the step of generating the switching signal includes: determining a trigger timing point of the switching signal according to a first waveform characteristic of a ringing signal, so as to control the primary side switch to be ON; and wherein the step of generating the ZVS pulse includes: determining a trigger timing point of the ZVS pulse according to a second waveform characteristic of the ringing signal, so as to control the winding of the power transformer to be ON for a predetermined ZVS time period, thereby achieving zero voltage switching of the primary side switch; wherein the ringing signal is related to a ringing current of the power transformer.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 2A:
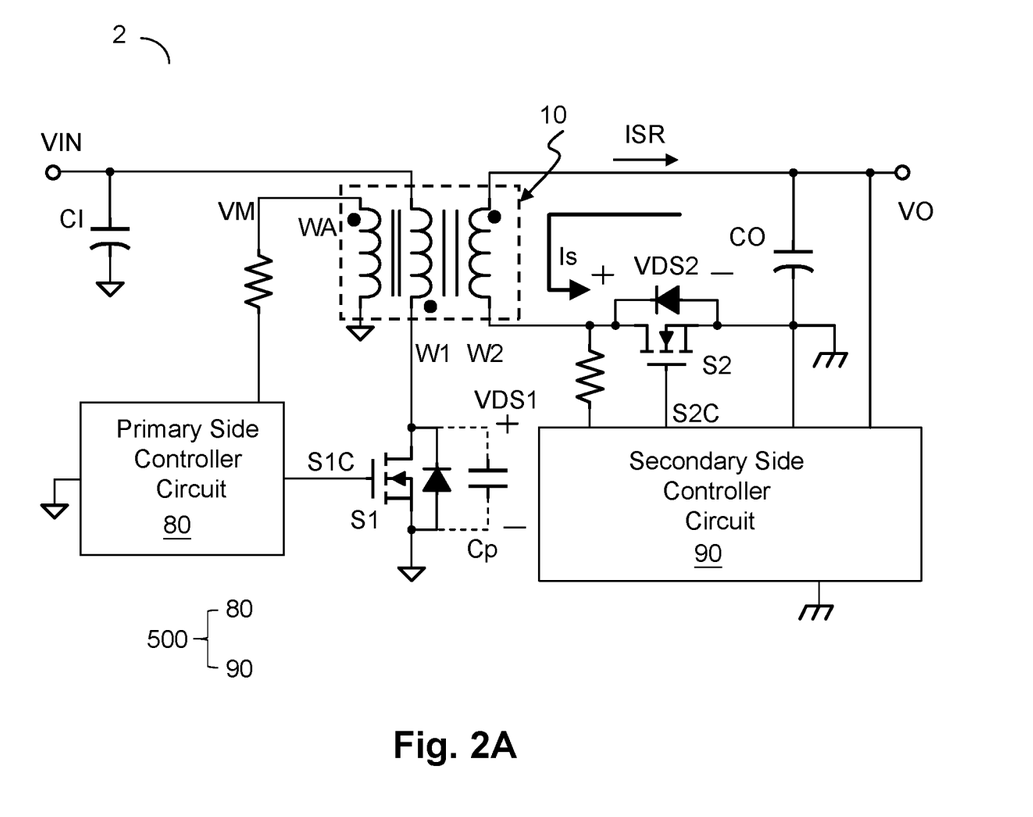
FIGS. 2A-2B show schematic diagrams of a ZVS control circuit for use in a flyback power converter according to embodiments of the present invention.

Please refer to FIG. 2A, which shows a schematic diagram of a ZVS control circuit (i.e., a ZVS control circuit 500) according to an embodiment of the present invention. In this embodiment, the ZVS control circuit 500 is adopted to control the flyback power converter 2 to convert an input voltage VIN to an output voltage VO. The ZVS control circuit 500 comprises: a primary side controller circuit 80 and a secondary side controller circuit 90. The primary side controller circuit 80 is configured to operably generate a switching signal S1C, to control a primary side switch S1, thereby controlling a primary side winding W1 of the power transformer 10. The primary side winding W1 is coupled to the input voltage VIN. The secondary side controller circuit 90 is configured to operably generate a synchronous rectifier (SR) control signal S2C for controlling the synchronous rectifier switch S2, thereby controlling a secondary side winding W2 of the power transformer 10, to generate the output voltage VO.

Figure 3:
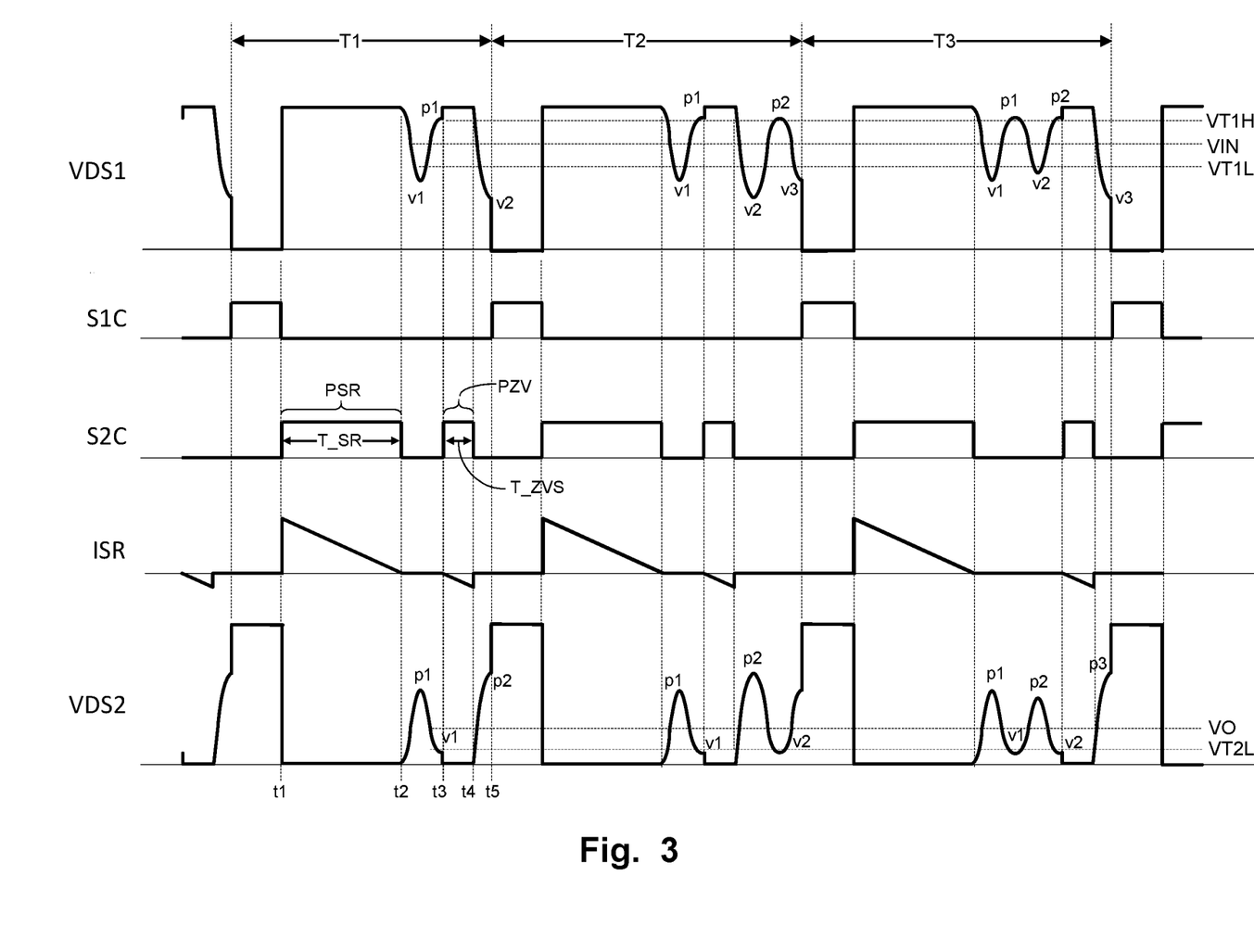
FIG. 3 shows waveforms corresponding to a flyback power converter of the present invention.

Please refer to FIG. 2 along with FIG. 3. FIG. 3 shows waveforms corresponding to a flyback power converter of the present invention. According to the present invention, the SR control signal S2C includes an SR-control pulse PSR and a ZVS pulse PZV. When the primary side switch S1 is turned ON and then OFF (as shown by the timing point t1 in FIG. 3), the SR-control pulse PSR controls the synchronous rectifier switch S2 to be ON for an SR time period T_SR, to perform secondary side synchronous rectification. The SR time period T_SR is substantially synchronous with the conduction time of an induction current of the secondary side winding W2. In other words, the SR time period T_SR begins at a timing point (i.e., the timing point t1) when the secondary side winding W2 starts generating the induction current due to energy transferred from the primary side winding W1 to the secondary side winding W2, and the SR time period T_SR ends at a timing point (i.e., as shown by the timing point t2 in FIG. 3) when the induction current of the secondary side winding W2 is reduced to zero; thus, the power conversion efficiency can be accordingly improved.

Figure 2B:
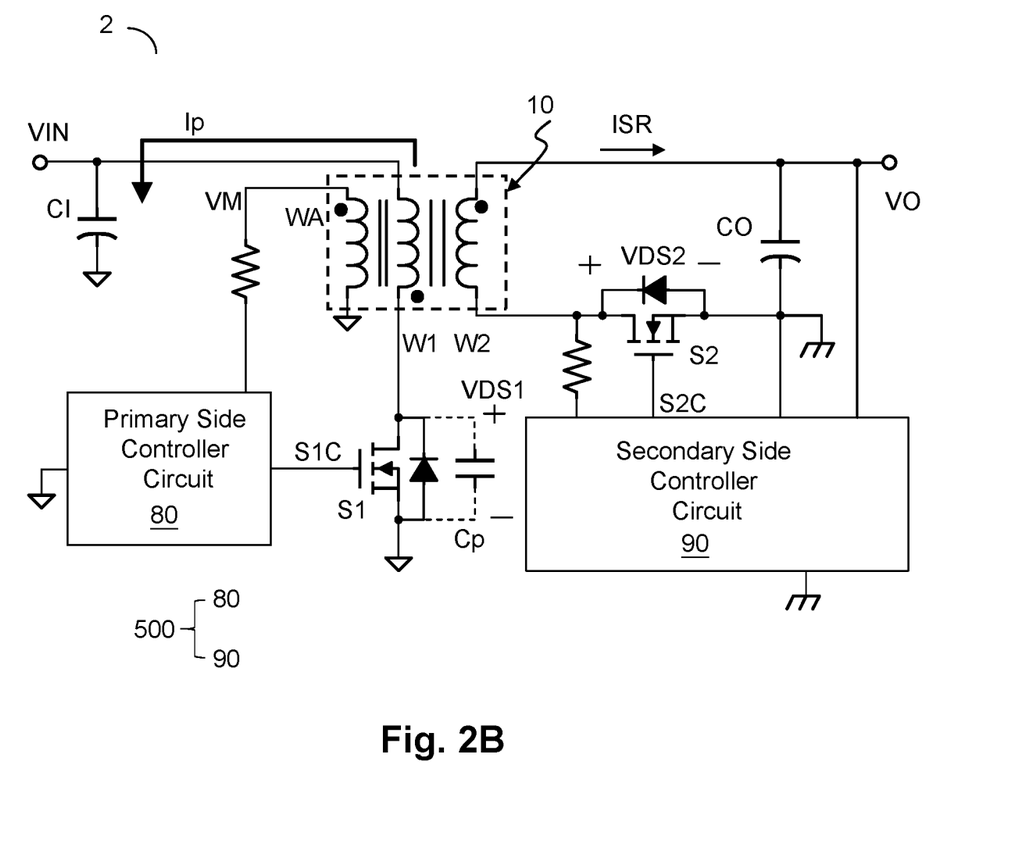

On the other hand, the ZVS pulse PZV is configured to achieve zero voltage switching on the primary side switch S1. When the power transformer 10 is demagnetized and the synchronous rectifier switch S2 is turned ON again (as shown by the timing point t3 in FIG. 3) according to the ZVS pulse PZV, the power transformer 10 will induce a circulation current Is at the secondary side winding W2 (as shown in FIG. 2A). That is, as shown in FIG. 3, under a situation where a secondary side current ISR is a negative current (e.g., from the timing point t3 to the timing point t4), the circulation current Is will transfer energy from an output capacitor CO to the secondary side winding W2. Afterward, when the synchronous rectifier switch S2 is turned OFF at a timing point (i.e., as shown by the timing point t4 in FIG. 3) at the end of the ZVS pulse PZV, the power transformer 10 will induce a circulation current Ip at the primary side winding W1 (as shown in FIG. 2B). According to the present invention, the circulation current Ip at the primary side winding W1 can discharge the parasitic capacitor Cp of the primary side switch S1 substantially to 0V, and the charges of the parasitic capacitor Cp will be transferred to an input capacitor CI. Consequently, the primary side switch S1 can achieve zero voltage switching (ZVS) when the primary side switch S1 is turned ON in the next cycle and further cycles.

Note that the term "zero voltage switching", as used herein, means thus. Before a transistor (such as the primary side switch S1) is turned ON, the residual voltage of the parasitic capacitor (e.g. the parasitic capacitor Cp across drain and source) of the transistor (e.g., the primary side switch S1) is substantially discharged to 0V by a discharging current through a storage path (e.g., the primary side winding W1) which transfers the charges of the parasitic capacitor to a storage device, such that when the transistor (e.g., the primary side switch S1) is turned ON, the drain-source voltage of the transistor is substantially 0V. Since the charges in the parasitic capacitor CP are not discharged by the transistor which has its conduction resistance, the power conversion efficiency can be improved.

Note that although the parasitic capacitor being discharged to 0V is preferred, however due to non-idealities caused by for example imperfection of components or imperfect matching among components, the voltage of the parasitic capacitor may not be discharged exactly to 0V, but just close to 0V. In other words, according to the present invention, a certain level of tolerance between 0V and the voltage on the parasitic capacitor after discharge is acceptable, and therefore the term "substantially" is used to mean that a tolerable range is acceptable.

In one embodiment, the ZVS control circuit of the present invention is configured to operably control a flyback power converter to operate under a discontinuous conduction mode (DCM). More particularly, under a discontinuous conduction mode (DCM), the present invention can, via a ringing signal which is related to a ringing current of the power transformer 10, synchronize the above-mentioned switching signal S1C and the ZVS pulse PZV, thereby achieving zero voltage switching of the primary side switch S1. The details as to how this is achieved will be explained later.

Note that the term "ringing current", as used herein, means thus. Under a situation where the flyback power converter operates under a DCM, after the SR-control pulse PSR ends (i.e., after the secondary side current ISR has reduced to zero, as shown by the timing point t2 in FIG. 3), a resonance having a ringing period will be generated among the windings of the power transformer 10 and the capacitors or parasitic capacitors coupled thereto, causing a ringing current to be generated on the windings. During the period wherein a ringing current is generated, a signal related to such ringing current can be obtained via a primary side voltage VDS1 and/or a secondary side voltage VDS2. Such signal related to the ringing current is referred to as a "ringing signal" in this specification. In other words, form one perspective, in one embodiment, the ringing signal includes the primary side voltage VDS1 and/or the secondary side voltage VDS2. The primary side voltage VDS1 is a voltage drop between a current in-flow terminal and a current out-flow terminal of the primary side switch S1, and the secondary side voltage VDS2 is a voltage drop between a current in-flow terminal and a current out-flow terminal of the synchronous rectifier switch S2. Note that, in one embodiment, under a situation where the power transformer 10 and other devices operate under steady and constant condition, the ringing period of the ringing signal is substantially a constant. Accordingly, the present invention can adopt the ringing signal to synchronize the switching signal S1C and the ZVS pulse PZV.

Please still refer to FIG. 3. In one embodiment, after the SR-control pulse PSR ends, on one hand, the primary side controller circuit 80 determines a trigger timing point of the switching signal S1C according to a first waveform characteristic of the ringing signal, to control the primary side switch S1 to be turned ON; on the other hand, the secondary side controller circuit 90 determines a trigger timing point of the ZVS pulse PZV according to a second waveform characteristic of the ringing signal, to control the synchronous rectifier switch S2 to be turned ON for a predetermined ZVS time period T_ZVS. Consequently, zero voltage switching of the primary side switch S1 can be achieved.

In one embodiment, the above-mentioned first waveform characteristic or second waveform characteristic can be, for example but not limited to, a peak, a valley, a rising edge or a falling edge of the ringing signal. Or, in another embodiment, the above-mentioned first waveform characteristic or second waveform characteristic can be, for example but not limited to, a waveform characteristic related to a slope of the ringing signal.

Please still refer to FIG. 3. In one specific embodiment, the switching signal S1C controls the primary side switch S1 according to a switching period (e.g., as shown by the switching periods T1, T2 and T3 in FIG. 3), wherein during a present switching period, the trigger timing point of the switching signal S1C is synchronous with a valley or a falling edge of the primary side voltage VDS1. In one embodiment, preferably, as shown in FIG. 3, the trigger timing point of the switching signal S1C is synchronous with a valley of the primary side voltage VDS1, so that the power conversion efficiency can be further improved.

For example, referring to FIG. 3, the trigger timing point of the switching signal S1C (to start the switching period T2) is synchronous with the second valley v2 during the switching period T1 of the primary side voltage VDS1. Or, the trigger timing point of the switching signal S1C (to start the switching period T3) is synchronous with the third valley v3 during the switching period T2 of the primary side voltage VDS1. Or, the trigger timing point of the switching signal S1C (to start the switching period next to the switching period T3) is synchronous with the third valley v3 during the switching period 13 of the primary side voltage VDS1. In practical application, it is possible for the trigger timing point of the switching signal S1C to be shifted later or earlier as the input voltage VIN or load varies, or as the setting of the output voltage varies. Nevertheless, according to the above-mentioned mechanism of the present invention, the trigger timing point of the switching signal S1C is controlled to be synchronous with a first waveform characteristic of the ringing signal such as a valley or a falling edge of the primary side voltage VDS1.

Note that in FIG. 3 and the following drawings, the reference character pN (where N can be 1, 2, 3 and so on) indicates the Nth peak, and the reference character vM (where M can be 1, 2, 3 and so on) indicates the Mth valley.

Please still refer to FIG. 3. In one embodiment, during a present switching period, the trigger timing point of the ZVS pulse PZV can be determined as: the timing point of a predetermined number of occurrences of second waveform characteristics of the ringing signal. The above-mentioned "predetermined number of occurrences" is related to the number of the first waveform characteristic or the number of the second waveform characteristic in a previous switching period preceding the present switching period. Consequently, under a steady state, the trigger timing point of the ZVS pulse PZV is earlier than the trigger timing point of the switching signal S1C by a predetermined time difference, so as to ensure achieving zero voltage switching of the primary side switch S1.

In one specific embodiment, during a present switching period, the trigger timing point of the ZVS pulse PZV can be determined as the timing point of a predetermined number of occurrences of peaks or rising edges of the primary side voltage VDS1, wherein the "predetermined number of occurrences" is a total number of valleys or falling edges of the primary side voltage VDS1 in the previous switching period minus one.

Please still refer to FIG. 3. In more detail, if T2 is the "present switching period", then T1 is the "previous switching period". As shown in FIG. 3, during the previous switching period T1, the total number of valleys of the primary side voltage VDS1 is two (i.e., the valley v1 and the valley v2 during T1). Hence, in the present switching period T2, the trigger timing point of the ZVS pulse PZV is determined as the timing point of the occurrence of the first peak of the primary side voltage VDS1 (because during the previous switching period T1, the total number of valleys or falling edges of the primary side voltage VDS1 is two and because two minus one is equal to one, during the present switching period T2, the first peak is adopted). In another case, when T3 is the present switching period, then T2 is the previous switching period; as shown in FIG. 3, during the previous switching period T2, a total number of valleys of the primary side voltage VDS1 is three (i.e., the valley v1, the valley v2 and the valley v3 during T2). Hence, in the present switching period T3, the trigger timing point of the ZVS pulse PZV is determined by the timing point of the occurrence of the second peak of the primary side voltage VDS1 of the primary side voltage VDS1 (because during the previous switching period T2, the total number of valleys or falling edges of the primary side voltage VDS1 is three and because three minus one is equal to two, during the present switching period T3, the second peak is adopted).

In the above-mentioned specific embodiment, the trigger timing point of the switching signal S1C is synchronous with a valley (i.e., the first waveform characteristic) of the primary side voltage VDS1, and the trigger timing point of the ZVS pulse PZV is determined as the timing point of the occurrence of a predetermined number of peaks (i.e., the second waveform characteristic) of the primary side voltage VDS1. Because the predetermined number is related to a total number of valleys (i.e., the first waveform characteristic) in the previous switching period, (wherein in one preferable embodiment the predetermined number is the total number of valleys in the previous switching period minus one), when the flyback power converter 2 operates under a steady state, the trigger timing point of the ZVS pulse PZV can be ensured earlier than the trigger timing point of the switching signal S1C by a predetermined time difference, to ensure achieving zero voltage switching of the primary side switch S1. It is noteworthy that, in one embodiment, the above-mentioned predetermined time difference is related to a ringing period of the ringing signal. In one embodiment, as shown in FIG. 3, under a steady state, the predetermined time difference can be, for example but not limited to, about one-fourth (i.e., ¼) of a ringing period plus the predetermined ZVS time period T_ZVS, for example as shown by the time difference between an ending timing point of the ZVS pulse PZV and the timing point of the third valley v3 during the switching period T3.

While a specific embodiment has been described in the above, it should be understood that by using different first and/or second waveform characteristics and/or different predetermined numbers, different predetermined time differences will be obtained. In different embodiments, such different predetermined time differences can be related to, for example but not limited to, one-eighth (i.e., ⅛), one-second (i.e., ½), three-forth (i.e., ¾), or one ringing period, or a combination of the above. Those skilled in this art should readily conceive variations and modifications within the spirit of the present invention, so the details thereof are not redundantly explained here.

From a broader perspective, the secondary side controller circuit 90 determines a trigger timing point of the ZVS pulse PZV according to the second waveform characteristic, so as to control the synchronous rectifier switch S2 to be turned ON for a predetermined ZVS time period T_ZVS before the primary side switch S1 is turned ON. Thus, under a steady state, the trigger timing point of the ZVS pulse PZV can be ensured earlier than the trigger timing point of the switching signal S1C by a predetermined time difference, to ensure achieving zero voltage switching of the primary side switch S1.

As mentioned above, it is possible for the trigger timing point of the switching signal S1C to be shifted later or earlier as the power condition or load condition varies. In one embodiment, during the present switching period, when the trigger timing point of the ZVS pulse PZV is later than the trigger timing point of the switching signal S1C, the ZVS pulse PZV is not triggered. In other words, under such circumstance, during the present switching period, the ZVS pulse PZV is omitted and is not triggered. However, this is only a transient state and after several switching periods, the above-mentioned control mechanism will still trigger the ZVS pulse PZV.

In one embodiment, in order not to cause the ZVS pulse PZV to overlap with the switching signal SIC, the criteria to omit the ZVS pulse PZV can be broadened to: not to trigger the ZVS pulse PZV when a time difference between an intended trigger timing point of the ZVS pulse PZV and a trigger timing point of the switching signal S1C is smaller than a time threshold.

On the other hand, as shown in FIG. 3, in the switching period T2, the trigger timing point of the switching signal S1C is delayed (as compared to the switching period T1) for example due to the power condition or the load condition, and thus in the switching period T2, the time difference between the trigger timing point of the ZVS pulse PZV and the trigger timing point of the switching signal S1C is equal to 1.5-fold of the ringing period plus the predetermined ZVS time period T_ZVS. Although such condition will somewhat degrade the efficacy for achieving zero voltage switching of the primary side switch S1 in the switching period T2, nevertheless, this is only a transient state and after several switching periods, the system will restore to the steady state (e.g., in the switching period T3). In other words, the system will be restored to a relationship wherein the trigger timing point of the ZVS pulse PZV is earlier than the trigger timing point of the switching signal S1C by a predetermined time difference (e.g., as shown by the relationship in the switching period T3), thereby achieving zero voltage switching of the primary side switch S1.

Please still refer to FIG. 3. As mentioned above, in one embodiment, the ringing signal can be the secondary side voltage VDS2. In this case, the trigger timing point of the following ZVS pulse PZV can be determined according to the secondary side voltage VDS2. As shown in FIG. 3, in one embodiment, during the present switching period (e.g., the switching period T3), the trigger timing point of the ZVS pulse PZV can be determined as the occurrence of a predetermined number of valleys (i.e., as shown by the second valley v2 during T3) or falling edges of the secondary side voltage VDS2. In this embodiment, the "predetermined number" is a total number of valleys or falling edges of the secondary side voltage VDS2 during the previous switching period (e.g., the switching period T2; during the switching period T2, a total number of valleys of the secondary side voltage VDS2 is two).

Because there is a certain relationship among the voltages of the windings of a transformer, information regarding the primary side voltage VDS1 can be obtained through another winding (e.g., the secondary side winding W2 or any other winding such as an auxiliary winding WA) of the power transformer 10. That is, equivalently, the primary side voltage VDS1 can be obtained through the secondary side voltage VDS2 or an auxiliary winding WA (referring to FIG. 2A).

In one specific embodiment, the peak or rising edge of the ringing signal can be detected by detecting whether the ringing signal rises up to a first voltage threshold. In another specific embodiment, the valley or falling edge of the ringing signal can be detected by detecting whether the ringing signal drops to a second voltage threshold.

Please still refer to FIG. 3. In one embodiment, in the case that the ringing signal is the primary side voltage VDS1, the first voltage threshold corresponding to the primary side voltage VDS1 can be, for example but not limited to, the voltage threshold VT1H shown in FIG. 3. In one embodiment, the voltage threshold VT1H is related to the input voltage VIN. That is, for example, in one embodiment, the voltage threshold VT1H can be equal to the input voltage VIN. Or, in another embodiment, the voltage threshold VT1H can be equal to the input voltage VIN plus an offset value, so that the voltage threshold VT1H is higher than the input voltage VIN. Under such situation, the voltage threshold VT1H is closer to the peak of the primary side voltage VDS1.

Please still refer to FIG. 3. In one embodiment, in the case that the ringing signal is the primary side voltage VDS1, the second voltage threshold corresponding to the primary side voltage VDS1 can be, for example but not limited to, the voltage threshold VT1L shown in FIG. 3A. In one embodiment, the voltage threshold VT1L is related to the input voltage VIN. That is, for example, in one embodiment, the voltage threshold VT1L can be equal to the input voltage VIN. Or, in another embodiment, the voltage threshold VT1L can be equal to the input voltage VIN minus an offset value, so that the voltage threshold VT1L is lower than the input voltage VIN. Under such situation, the voltage threshold VT1L is closer to the valley of the primary side voltage VDS1.

The above-mentioned approaches to detect a peak, a valley, a rising edge or a falling edge of the primary side voltage VDS1 can be similarly applied to detecting a peak, a valley, a rising edge or a falling edge of the secondary side voltage VDS2.

Please still refer to FIG. 3. For example, in one embodiment, in the case that the ringing signal is the secondary side voltage VDS2, the second voltage threshold corresponding to the secondary side voltage VDS2 can be, for example but not limited to, the voltage threshold VT2L shown in FIG. 3A. In one embodiment, the voltage threshold VT2L is related to the output voltage VO. That is, for example, in one embodiment, the voltage threshold VT2L can be equal to the output voltage VO. Or, in another embodiment, the voltage threshold VT2L can be equal to a divided voltage of the output voltage VO, so that the voltage threshold VT2L is lower than the output voltage VO. Under such situation, the voltage threshold VT2L is closer to the valley of the secondary side voltage VDS2.

Figure 4:
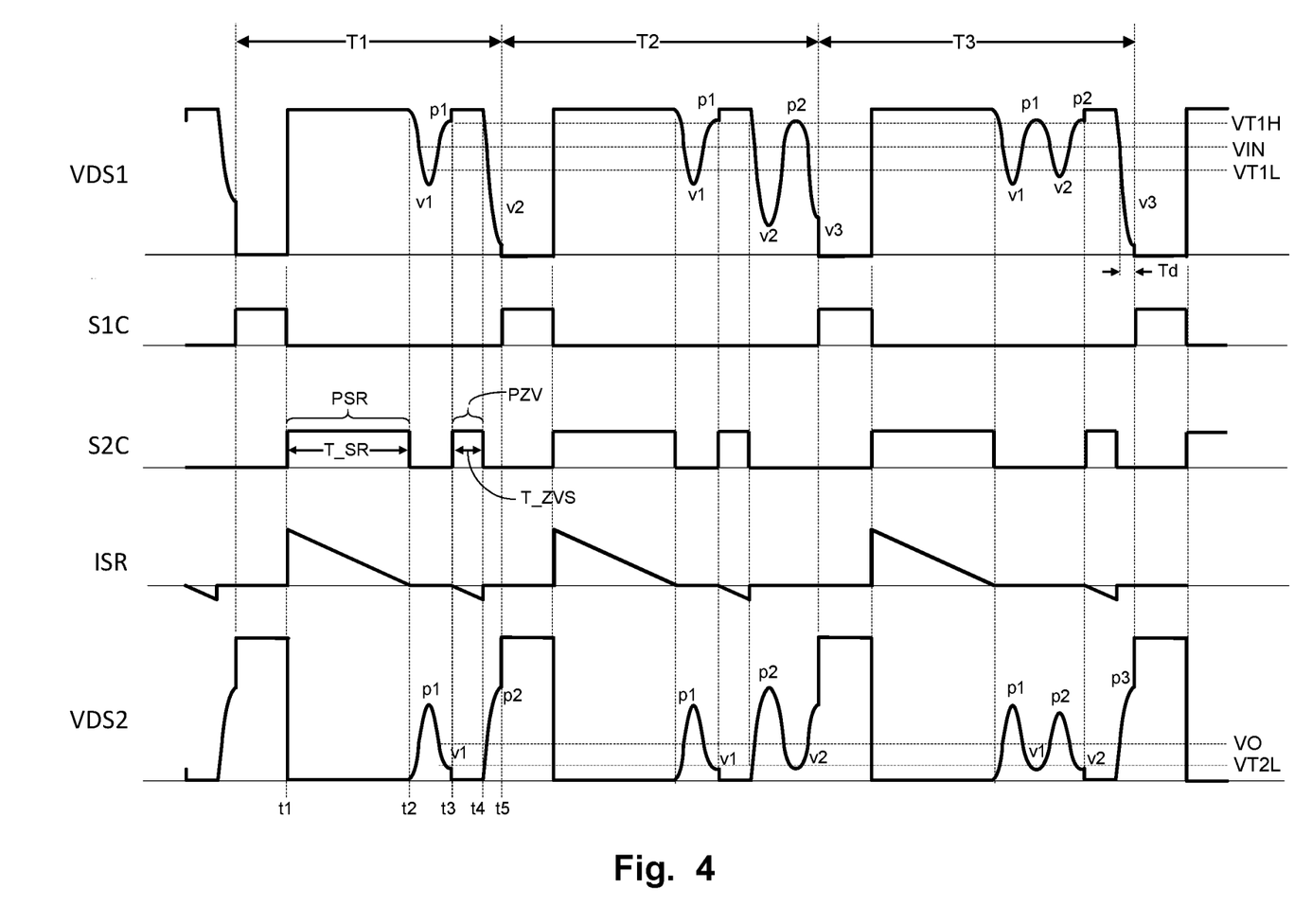
FIG. 4 shows waveforms corresponding to a flyback power converter of the present invention.

To better achieve zero voltage switching of the primary side switch S1, in one embodiment, the ZVS control circuit 500 of the present invention is further equipped with delayed start-up mechanism. Please refer to FIG. 4. FIG. 4 shows waveforms corresponding to a flyback power converter of the present invention. In this embodiment, after a valley or a falling edge (or other waveform characteristics) of the primary side voltage VDS1 has occurred, the switching signal S1C is triggered after a predetermined delay period from the valley or falling edge (or other waveform characteristics). For example, as shown by the switching period T3 in FIG. 4, after the primary side voltage VDS1 drops to the voltage threshold VT1L, the switching signal S1C is triggered after a predetermined delay period Td from when the primary side voltage VDS1 drops to the voltage threshold VT1L. As a result, it can better ensure the primary side switch S1 to achieve zero voltage switching.

Figure 5:
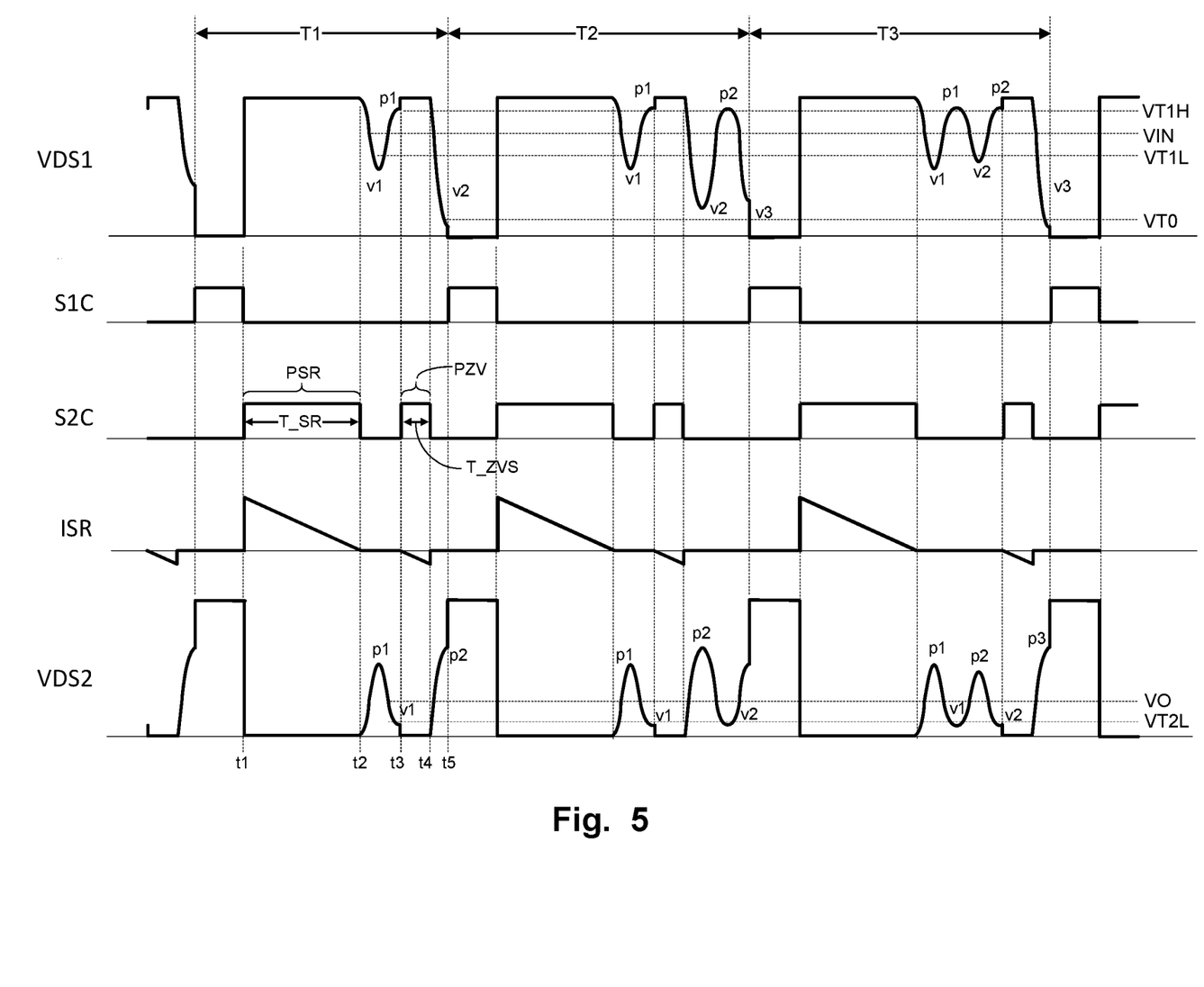
FIG. 5 shows waveforms corresponding to a flyback power converter of the present invention.

Additionally, in one embodiment, the ZVS control circuit 500 of the present invention further includes a voltage threshold specifically designed for achieving zero voltage switching of the primary side switch S1. Please refer to FIG. 5. FIG. 5 shows waveforms corresponding to a flyback power converter of the present invention. In this embodiment, during a present switching period, under a situation where the ZVS pulse PZV exists, because it is anticipated that the primary side voltage VDS1 will drop to zero, a voltage threshold can be set so that the switching signal S1C is triggered only when the primary side voltage VDS1 has dropped to this voltage threshold. For example, as shown by the switching period T3 in FIG. 5, the switching signal S1C is triggered only when the primary side voltage VDS1 has dropped to the voltage threshold VT0. As a result, it can better ensure the primary side switch S1 to achieve zero voltage switching. In other words, in this embodiment, the voltage threshold (e.g., VT1L) for counting the number of the valleys can be different from the voltage threshold (e.g., VT0) for triggering the switching signal S1C. To be more specific, the level of the voltage threshold VT0 can be set lower than the level of the voltage threshold VT1L, that is, the level of the voltage threshold VT0 can be set closer to zero than the level of the voltage threshold VT1L.

While several specific embodiments have been illustrated in the above, in the spirit of the invention, the ZVS pulse PZV is not limited to controlling the synchronous rectifier switch S2 at the secondary side to operate the secondary side winding W2 of the power transformer 10 to achieve zero voltage switching of the primary side switch S1. In another embodiment, the ZVS pulse PZV can be adopted to control any one of the windings of the power transformer 10, to achieve zero voltage switching of the primary side switch S1. The "any one of the windings" of the power transformer 10 can be the primary side winding W1, the secondary side winding W2, the auxiliary winding WA or any other winding of the power transformer 10. Under such circumstance, the controller circuit configured to operably generate the ZVS pulse PZV can be broadly regarded as a second controller circuit. For example, as shown in the embodiment of FIG. 2A, the second controller circuit corresponds to the secondary side controller circuit 90.

Figure 6:
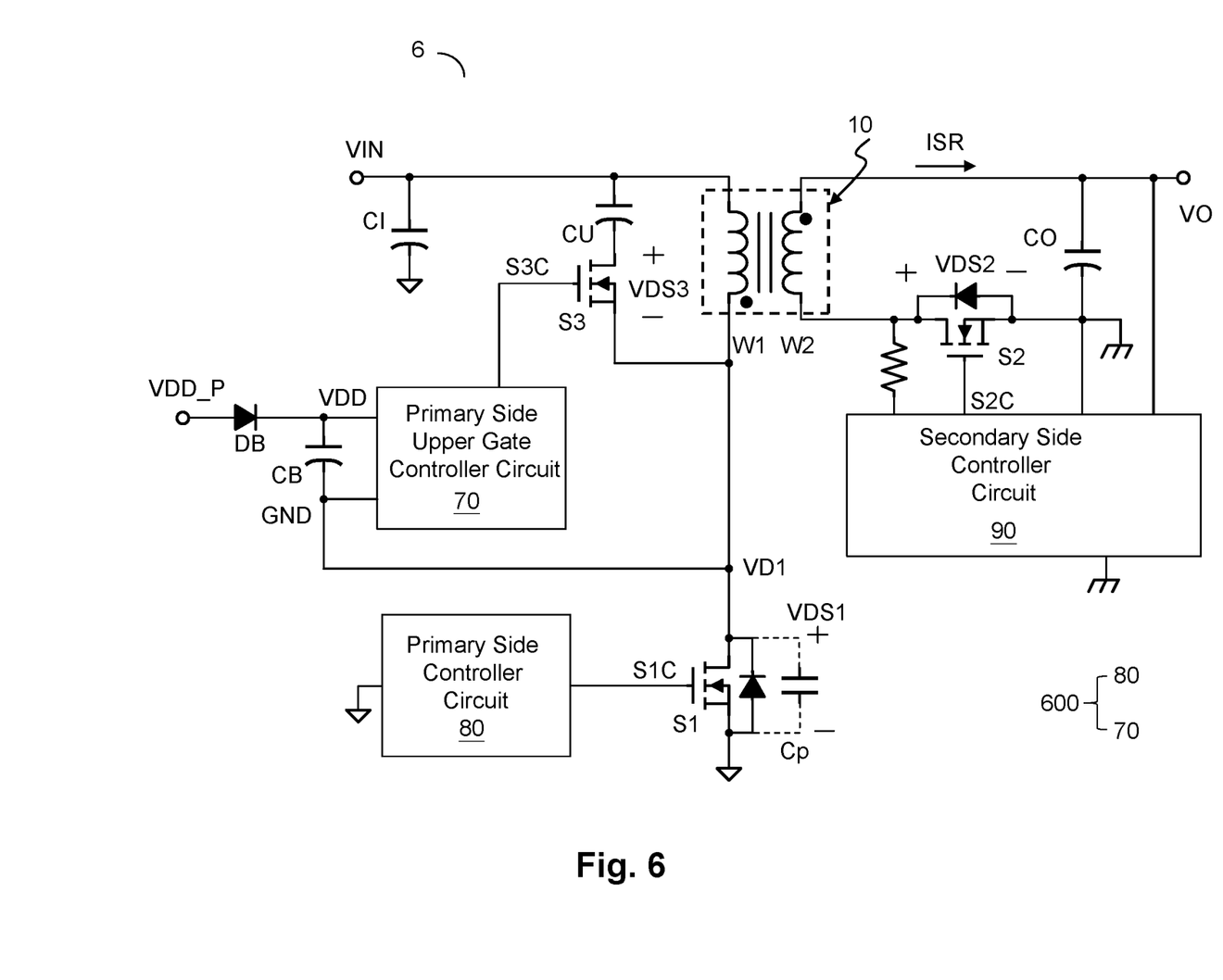
FIG. 6 shows a schematic diagram of a flyback power converter according to an embodiment of the present invention.

Please refer to FIG. 6, which shows a schematic diagram of a flyback power converter (i.e., a flyback power converter 6) according to an embodiment of the present invention. As shown in FIG. 6, in one embodiment, the ZVS control circuit 600 comprises: a primary side controller circuit 80 and a second controller circuit. In this embodiment, the second controller circuit corresponds to a primary side upper gate controller circuit 70. The primary side upper gate controller circuit 70 is configured to operably generate an upper gate control signal S3C for controlling an upper gate switch S3, for controlling the primary side winding W1. As shown in FIG. 6, in one embodiment, the upper gate switch S3 and an upper gate capacitor CU are connected in series to form an upper gate branch circuit. The upper gate branch circuit is connected in parallel to the primary side winding W1. In this embodiment, the upper gate switch S3 has one end coupled to a coupling node VD1 between the primary side switch S1 and the primary side winding W1. The upper gate capacitor CU are coupled between another end of the upper gate switch S3 and the input voltage VIN.

Figure 7:
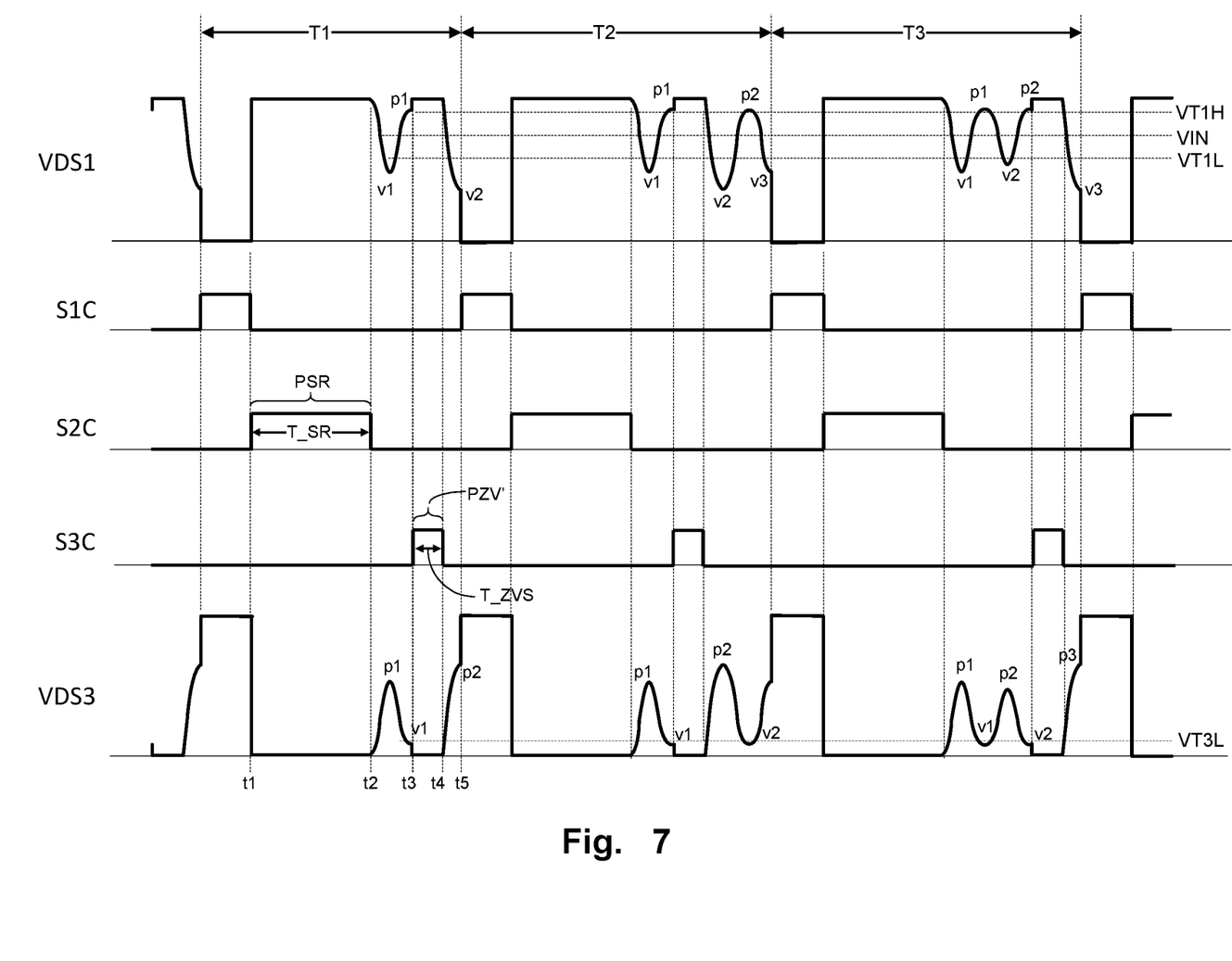
FIG. 7 shows waveforms corresponding to a flyback power converter of the present invention.

Please refer to FIG. 7 along with FIG. 6. FIG. 7 shows waveforms corresponding to a flyback power converter of the present invention. As shown in FIG. 7, the upper gate control signal S3C includes a ZVS pulse PZV'. The ZVS pulse PZV' is generated in the same way as the above-mentioned ZVS pulse PZV in the previous embodiments. That is, the ZVS pulse PZV' can be generated by any method for generating the above-mentioned ZVS pulse PZV as described in the previous embodiments. For example, this embodiment of FIG. 7 is similar to the embodiment of FIG. 3, but is different in that: the ZVS pulse PZV' of FIG. 7 is generated by the primary side upper gate controller circuit 70, namely, the upper gate control signal S3C includes the ZVS pulse PZV'. In this embodiment, on one hand, the primary side controller circuit 80 determines the trigger timing point of the switching signal S1C according to a first waveform characteristic of the ringing signal, to control the primary side switch S1 to be turned ON. On the other hand, the primary side upper gate controller circuit 70 determines the trigger timing point of the ZVS pulse PZV' according to a second waveform characteristic of the ringing signal, to control the upper gate switch S3 to be turned ON for a predetermined ZVS time period T_ZVS. Consequently, zero voltage switching of the primary side switch S1 can be achieved.

It is noteworthy that, in the embodiment of FIG. 6, the secondary side controller circuit 90 and the synchronous rectifier switch S2 can be omitted. Under such situation, in one embodiment, the secondary side winding W2 can be coupled to a rectifier device (e.g., a diode), to generate the output voltage VO.

Please still refer to FIG. 7. In one embodiment, the ringing signal can be an upper gate voltage VDS3. That is, the trigger timing point of the ZVS pulse PZV' can be determined based upon the upper gate voltage VDS3. As shown in FIG. 7, in one embodiment, during a present switching period (e.g., the switching period T3), the trigger timing point of the ZVS pulse PZV' can be determined based upon the timing point of a predetermined number of occurrences of valleys (e.g. the second valley v2 during T3 in FIG. 7) or falling edges of the upper gate voltage VDS3, wherein the "predetermined number of occurrences" is the number of the valleys or falling edges of the upper gate voltage VDS3 during a previous switching period (e.g., the switching period T2); for example, during the switching period T2 in FIG. 7, the number of valleys of the upper gate voltage VDS3 is two, which are the valley v1 and the valley v2.

As described above, the ZVS pulse PZV' can be generated v by any method for generating the above-mentioned ZVS pulse PZV as described in the previous embodiments (e.g., the embodiment of FIG. 4 or the embodiment of FIG. 5), so the details thereof are not redundantly repeated here.

Please refer to FIG. 6. It is noteworthy that, in this embodiment, a low reference voltage level (i.e., the ground level GND of the primary side upper gate controller circuit 70) of the primary side upper gate controller circuit 70 is coupled to a drain of the primary side switch S1, and the power supply VDD supplied to the primary side upper gate controller circuit 70 is generated from a power supply VDD_P via a bootstrap capacitor CB and a bootstrap diode DB. As shown in FIG. 6, in one embodiment, the bootstrap capacitor CB has one end coupled to the node VD1, and another end of the bootstrap capacitor CB and a current out-flow terminal of the bootstrap diode DB are commonly coupled to the power supply VDD. A current in-flow terminal of the bootstrap diode DB is coupled to the power supply VDD_P. Besides, in this embodiment, the primary side upper gate controller circuit 70 is coupled to the drain of the primary side switch S1, so as to detect the upper gate voltage VDS3. In another embodiment, the primary side upper gate controller circuit 70 can detect the upper gate voltage VDS3 further according to the input voltage VIN.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described herein before to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A zero voltage switching (ZVS) control circuit for use in a flyback power converter, the flyback power converter being configured to operably convert an input voltage to an output voltage, the ZVS control circuit comprising:

a primary side controller circuit, which is configured to operably generate a switching signal to control a primary side switch, thereby controlling a power transformer to convert the input voltage to the output voltage; and a second controller circuit, which is configured to operably generate a ZVS pulse to control a winding of the power transformer;

wherein the primary side controller circuit determines a trigger timing point of the switching signal according to a first waveform characteristic of a ringing signal, so as to control the primary side switch to be ON, and wherein the second controller circuit determines a trigger timing point of the ZVS pulse according to a second waveform characteristic of the ringing signal, so as to control the winding of the power transformer to be ON for a predetermined ZVS time period, thereby achieving zero voltage switching of the primary side switch;

wherein the ringing signal is related to a ringing current of the power transformer; wherein the second controller circuit is configured as one of the following configurations:

(1) wherein the second controller circuit includes a secondary side controller circuit, and the winding of the power transformer is a secondary side winding of the power transformer; the secondary side controller circuit being configured to operably generate a synchronous rectifier (SR) control signal for controlling a synchronous rectifier switch, thereby controlling the secondary side winding of the power transformer to generate the output voltage, wherein the SR control signal includes an SR-control pulse and the ZVS pulse, wherein the SR-control pulse is configured to operably control the synchronous rectifier switch to be ON for an SR time period to perform secondary side synchronous rectification, and wherein the ZVS pulse is configured to operably control the synchronous rectifier switch to be ON for the predetermined ZVS time period, to achieve zero voltage switching of the primary side switch; or (2) wherein the second controller circuit includes a primary side upper gate controller circuit, and the winding of the power transformer is a primary side winding of the power transformer, wherein the primary side upper gate controller circuit is configured to operably generate the ZVS pulse for controlling an upper gate switch, the ZVS pulse being configured to operably control the upper gate switch to be ON for the predetermined ZVS time period, thereby achieving zero voltage switching of the primary side switch; wherein the upper gate switch and an upper gate capacitor are connected in series to form an upper gate branch circuit, the upper gate branch circuit being connected in parallel to the primary side winding.

2. The ZVS control circuit of claim 1, wherein the second controller circuit determines the trigger timing point of the ZVS pulse according to the second waveform characteristic, so as to control the winding of the power transformer to be ON for the predetermined ZVS time period before the primary side switch is turned ON, so that under a steady state, the trigger timing point of the ZVS pulse is earlier than the trigger timing point of the switching signal by a predetermined time difference, thereby achieving zero voltage switching of the primary side switch; wherein the predetermined time difference is related to a ringing period of the ringing signal.

3. The ZVS control circuit of claim 1, wherein the flyback power converter operates under a discontinuous conduction mode (DCM).

4. The ZVS control circuit of claim 1, wherein the first waveform characteristic includes a peak, a valley, a rising edge or a falling edge of the ringing signal, and wherein the second waveform characteristic includes a peak, a valley, a rising edge or a falling edge of the ringing signal.

5. The ZVS control circuit of claim 1, wherein the switching signal is configured to operably control the primary side switch according to a switching period, wherein during a present switching period, the trigger timing point of the ZVS pulse is a timing point of a predetermined number of occurrences of the second waveform characteristic of the ringing signal, wherein the predetermined number is related to a number of occurrences of the first waveform characteristic or a number of occurrences of the second waveform characteristic of a previous switching period.

6. The ZVS control circuit of claim 5, wherein during the present switching period, when the trigger timing point of the ZVS pulse is later than the trigger timing point of the switching signal, the ZVS pulse is not triggered.

7. The ZVS control circuit of claim 1, wherein the ringing signal includes a primary side voltage, and wherein the primary side voltage is a voltage drop between a current in-flow terminal and a current out-flow terminal of the primary side switch.

8. The ZVS control circuit of claim 7, wherein the trigger timing point of the switching signal is synchronous with a valley or a falling edge of the primary side voltage, and wherein during a present switching period, the trigger timing point of the ZVS pulse is a timing point of a predetermined number of occurrences of peaks or rising edges of the primary side voltage, wherein the predetermined number is a total number of the valleys or the falling edges of the primary side voltage during a previous switching period minus one.

9. The ZVS control circuit of claim 7, wherein the switching signal is triggered after a predetermined delay period from when a valley or a falling edge of the primary side voltage occurs.

10. The ZVS control circuit of claim 1, wherein in the configuration (1), the ringing signal includes a primary side voltage and a secondary side voltage, and wherein the primary side voltage is a voltage drop between a current in-flow terminal and a current out-flow terminal of the primary side switch, and the secondary side voltage is a voltage drop between a current in-flow terminal and a current out-flow terminal of the synchronous rectifier switch;

wherein the trigger timing point of the switching signal is synchronous with a valley or a falling edge of the primary side voltage, and wherein during a present switching period, the trigger timing point of the ZVS pulse is a timing point of a predetermined number of occurrences of valleys or falling edges of the secondary side voltage, wherein the predetermined number is a total number of the valleys or the falling edges of the secondary side voltage during a previous switching period.

11. The ZVS control circuit of claim 10, wherein the primary side voltage is obtained through another winding of the power transformer which is not a primary side winding of the power transformer.

12. The ZVS control circuit of claim 1, wherein in the configuration (1), each peak or each rising edge of the ringing signal is determined through detecting whether the ringing signal rises up to a first voltage threshold; and/or wherein each valley or each falling edge of the ringing signal is determined through detecting whether the ringing signal drops to a second voltage threshold.

13. The ZVS control circuit of claim 12, wherein the trigger timing point of the switching signal is determined through detecting whether the ringing signal drops to a third voltage threshold, wherein the third voltage threshold is lower than the second voltage threshold.

14. The ZVS control circuit of claim 12, wherein the ringing signal includes a primary side voltage and a secondary side voltage, and wherein the primary side voltage is a voltage drop between a current in-flow terminal and a current out-flow terminal of the primary side switch, and the secondary side voltage is a voltage drop between a current in-flow terminal and a current out-flow terminal of the synchronous rectifier switch, wherein the ZVS control circuit is characterized by at least one of the following:
(1) when the ringing signal is the primary side voltage, the first voltage threshold corresponding to the primary side voltage is related to the input voltage;
(2) when the ringing signal is the primary side voltage, the first voltage threshold corresponding to the secondary side voltage is related to the input voltage; and/or
(3) when the ringing signal is the secondary side voltage, the second voltage threshold corresponding to the secondary side voltage is related to the output voltage.

15. The ZVS control circuit of claim 14, wherein the ZVS control circuit is characterized by at least one of the following:
(1) when the ringing signal is the primary side voltage, the first voltage threshold corresponding to the primary side voltage is higher than or equal to the input voltage;
(2) when the ringing signal is the primary side voltage, the first voltage threshold corresponding to the secondary side voltage is lower than or equal to the input voltage; and/or
(3) when the ringing signal is the secondary side voltage, the second voltage threshold corresponding to the secondary side voltage is a divided voltage of the output voltage.

16. The ZVS control circuit of claim 1, wherein in the configuration (2), the ringing signal includes a primary side voltage and an upper gate voltage, wherein the primary side voltage is a voltage drop between a current in-flow terminal and a current out-flow terminal of the primary side switch, and the upper gate voltage is a voltage drop between a current in-flow terminal and a current out-flow terminal of the upper gate switch;

wherein the trigger timing point of the switching signal is synchronous with a valley or a falling edge of the primary side voltage, and wherein during a present switching period, the trigger timing point of the ZVS pulse is a timing point of a predetermined number of occurrences of valleys or falling edges of the upper gate voltage, wherein the predetermined number is a total number of the valleys or the falling edges of the upper gate voltage during a previous switching period.

17. A flyback power converter, which is configured to operably convert an input voltage to an output voltage, the flyback power converter comprising:
a power transformer coupled between the input voltage and the output voltage;
a primary side switch coupled to a primary side of the power transformer; and
a zero voltage switching (ZVS) control circuit including:
a primary side controller circuit, which is configured to operably generate a switching signal to control the primary side switch, thereby controlling the power transformer to convert the input voltage to the output voltage; and
a second controller circuit, which is configured to operably generate a ZVS pulse to control a winding of the power transformer;
wherein the primary side controller circuit determines a trigger timing point of the switching signal according to a first waveform characteristic of a ringing signal, so as to control the primary side switch to be ON, and wherein the second controller circuit determines a trigger timing point of the ZVS pulse according to a second waveform characteristic of the ringing signal, so as to control the winding of the power transformer to be ON for a predetermined ZVS time period, thereby achieving zero voltage switching of the primary side switch;
wherein the ringing signal is related to a ringing current of the power transformer; wherein the second controller circuit is configured as one of the following configurations:
(1) wherein the second controller circuit includes a secondary side controller circuit, and the winding of the power transformer is a secondary side winding of the power transformer; the secondary side controller circuit being configured to operably generate a synchronous rectifier (SR) control signal for controlling a synchronous rectifier switch, thereby controlling the secondary side winding of the power transformer to generate the output voltage, wherein the SR control signal includes an SR-control pulse and the ZVS pulse, wherein the SR-control pulse is configured to operably control the synchronous rectifier switch to be ON for an SR time period to perform secondary side synchronous rectification, and wherein the ZVS pulse is configured to operably control the synchronous rectifier switch to be ON for the predetermined ZVS time period, to achieve zero voltage switching of the primary side switch; or
(2) wherein the second controller circuit includes a primary side upper gate controller circuit, and the winding of the power transformer is a primary side winding of the power transformer, wherein the primary side upper gate controller circuit is configured to operably generate the ZVS pulse for controlling an upper gate switch, the ZVS pulse being configured to operably control the upper gate switch to be ON for the predetermined ZVS time period, thereby achieving zero voltage switching of the primary side switch; wherein the upper gate switch and an upper gate capacitor are connected in series to form an upper gate branch circuit, the upper gate branch circuit being connected in parallel to the primary side winding.

18. The flyback power converter of claim 17, wherein the second controller circuit determines the trigger timing point of the ZVS pulse according to the second waveform characteristic, so as to control the winding of the power transformer to be ON for the predetermined ZVS time period before the primary side switch is turned ON, so that under a steady state, the trigger timing point of the ZVS pulse is earlier than the trigger timing point of the switching signal by a predetermined time difference, thereby achieving zero voltage switching of the primary side switch; wherein the predetermined time difference is related to a ringing period of the ringing signal.

19. The flyback power converter of claim 17, wherein the flyback power converter operates under a discontinuous conduction mode (DCM).

20. The flyback power converter of claim 17, wherein the first waveform characteristic includes a peak, a valley, a rising edge or a falling edge of the ringing signal, and wherein the second waveform characteristic includes a peak, a valley, a rising edge or a falling edge of the ringing signal.

21. The flyback power converter of claim 17, wherein the switching signal is configured to operably control the primary side switch according to a switching period, wherein during a present switching period, the trigger timing point of the ZVS pulse is a timing point of a predetermined number of occurrences of the second waveform characteristic of the ringing signal, wherein the predetermined number is related to a number of occurrences of the first waveform characteristic or a number of occurrences of the second waveform characteristic of a previous switching period.

22. The flyback power converter of claim 17, wherein in the configuration (1), the ringing signal includes a primary side voltage and a secondary side voltage, and wherein the primary side voltage is a voltage drop between a current in-flow terminal and a current out-flow terminal of the primary side switch, and the secondary side voltage is a voltage drop between a current in-flow terminal and a current out-flow terminal of the synchronous rectifier switch;
wherein the trigger timing point of the switching signal is synchronous with a valley or a falling edge of the primary side voltage, and wherein during a present switching period, the trigger timing point of the ZVS pulse is a timing point of a predetermined number of occurrences of valleys or falling edges of the secondary side voltage, wherein the predetermined number is a total number of the valleys or the falling edges of the secondary side voltage during a previous switching period.

23. The flyback power converter of claim 17, wherein in the configuration (2), the ringing signal includes a primary side voltage and an upper gate voltage, wherein the primary side voltage is a voltage drop between a current in-flow terminal and a current out-flow terminal of the primary side switch, and the upper gate voltage is a voltage drop between a current in-flow terminal and a current out-flow terminal of the upper gate switch;
wherein the trigger timing point of the switching signal is synchronous with a valley or a falling edge of the primary side voltage, and wherein during a present switching period, the trigger timing point of the ZVS pulse is a timing point of a predetermined number of occurrences of valleys or falling edges of the upper gate voltage, wherein the predetermined number is a total number of the valleys or the falling edges of the upper gate voltage during a previous switching period.

24. A control method of a flyback power converter, the control method being configured to operably control the flyback power converter to convert an input voltage to an output voltage, the control method comprising:

generating a switching signal to control a primary side switch, thereby controlling a power transformer; and generating a ZVS pulse to control a winding of the power transformer;

wherein the step of generating the switching signal includes:

determining a trigger timing point of the switching signal according to a first waveform characteristic of a ringing signal, so as to control the primary side switch to be ON;

wherein the step of generating the ZVS pulse includes:

determining a trigger timing point of the ZVS pulse according to a second waveform characteristic of the ringing signal, so as to control the winding of the power transformer to be ON for a predetermined ZVS time period, thereby achieving zero voltage switching of the primary side switch;

wherein the ringing signal is related to a ringing current of the power transformer;

wherein the switching signal is configured to operably control the primary side switch according to a switching period, wherein during a present switching period, the trigger timing point of the ZVS pulse is a timing point of a predetermined number of occurrences of the second waveform characteristic of the ringing signal, wherein the predetermined number is related to a number of occurrences of the first waveform characteristic or a number of occurrences of the second waveform characteristic of a previous switching period.

25. The control method of claim 24, wherein the flyback power converter operates under a discontinuous conduction mode (DCM).

26. The control method of claim 24, wherein the first waveform characteristic includes a peak, a valley, a rising edge or a falling edge of the ringing signal, and wherein the second waveform characteristic includes a peak, a valley, a rising edge or a falling edge of the ringing signal.

* * * * *